Patented Jan. 13, 1953

2,625,526

UNITED STATES PATENT OFFICE 2,625,526

POLYVINYLCHLORIDE-DIENENITRILE-POLYESTER COMPOSITION

William J. Sparks, Westfield, and David W. Young, Roselle, N. J., assignors to Standard Oil Development Company, a corporation of Delaware No Drawing. Application July 23, 1947, Serial No. 763,156

4 Claims. (Cl. 260—31.6)

This application relates to rubbery and other plastic compositions, and relates particularly to improved plasticized synthetic rubber and plastic compositions, containing condensation products or esters of dibasic organic acids with di-acid organic bases or glycols.

This application is a continuation-in-part of application Serial No. 504,754, filed October 2, 1943, now Patent 2,424,588.

The present invention utilizes as a compounding agent for its plasticizing and other effects, a new product consisting of a condensation product or ester of a polybasic organic acid with a di-acid organic base or glycol; it being essential for the purposes of the invention that either the acid or the base have a large number of carbon atoms ranging from 15 to 30, 40 or 50 carbon atoms per molecule. The other component may have any convenient number of carbon atoms from 2 to 50; and it is immaterial whether it is the dibasic acid or the di-acid base which has the carbon atom number above 15. A preferred embodiment of the invention utilizes as the thickener an ester of ethylene glycol and polymerized linoleic acid; ethylene glycol being the polyacid base and the polymerized or dimerized linoleic acid being the polybasic acid. The condensation or esterification of the two substances is conveniently accomplished at temperatures ranging from 150° C. or 160° C. to 180° C. or 190° C. The resulting condensation product is called a polyester.

The high molecular weight polybasic acids used in the preparation of these condensation products may conveniently be prepared from corn oil or soya bean oil by a method which is essentially that described by Bradley in Industrial and Engineering Chemistry, volume 33, page 86 (1941), this reference showing the preparation of methyl dilinoleate from dehydrated, or dimerized castor oil. An important distinction resides in the present composition of matter and the procedure should be that the esterification is conducted with a glycol rather than a mono alcohol. This difference results in the production of a linear chain multiple ester having a very high molecular weight ranging from 1000 to 75,000, as distinguished from Bradley's esters which add to the molecular weight of the dibasic acid only the amount of two additional methyl groups.

Thus the invention condenses a dibasic organic acid with a di-acid organic base to yield a very long chain linear polyester having a relatively large number of both the acid component and the basic component in the chain, and a considerable number of oxygen atoms both in the linear chain and in the side chains and the resulting high molecular weight polyester is then used for plasticizing and otherwise improving rubbery materials and plastics.

Broadly, this polyester is a condensation product of any dibasic organic acid with a di-acid organic base, one or both of which have from 15 to 50 carbon atoms per molecule. For the purposes of this invention it is immaterial what the character of the molecules is, and what additional substituents are present. Either or both may be saturated or unsaturated or multiple unsaturated. Either or both may be alkyl compounds or may contain aryl substituents. Either or both may contain alkyl, aryl or aromatic side chains or may contain inorganic side chains, especially halogens or the substituents from oxygen and sulfur groups or even metals. These materials are esterified, with the elimination of water, to yield a high molecular weight polyester condensation product, preferably having a molecular weight above 2000; the preferred embodiment utilizing superpoly esters having molecular weights ranging from 5000 to 40,000.

For the dibasic acid, such substances as dimerized linoleic acid or octadecadienoic acid or linoleic or dehydrated castor oil, and the like, are especially suitable. These compounds and analogous compounds generally, including any dibasic organic acid having carbon numbers above 12 or 15 may be used for the purposes of the invention when esterified with a di-acid base such as ethylene glycol. Alternatively, however, propylene glycol, butylene glycol, and the like, are equally satisfactory. Alternatively for the glycol, such substances as pentadiol or 2-methyl-2-4 pentadiol may equally well be used. Alternatively, much higher molecular weight glycols such as those prepared by the reduction of castor oil to yield a 12 hydroxy stearol type (now sold commercially under the trade name of Hydrofel Glycerides 200) or the dimerized and hydrogenated product of linoleic acid, or the like, may be used. As a still further alternative, the high molecular weight dimerized linoleic acid may be esterified with the high molecular weight glycol such as the 12 hydroxy stearol obtained from reduced castor oil or the like. In any event, the resulting polyester should have a molecular weight above 1,000, preferably about 5,000, and generally below 75,000 or 100,000.

The use of this polyester in waxy mineral lubricating oils and other liquid to solid petroleum hydrocarbons is claimed in application Serial No. 504,754, filed October 2, 1943, now Patent 2,424,588.

The polyester is compatible with linseed oil and similar paint components and when so used, it has a very valuable softening and elasticating effect upon the paint, especially after prolonged drying. It is co-soluble in thinners with practically all of the paint and varnish oils, gums and resins, and, while its presence somewhat increases the viscosity of the paint, this is readily overcome by the addition of small amounts of extra thinner. The high resistance of the polyester to oxidation, ultra violet light and similar influences, enables it to exert a very valuable protective effect upon the dried paint oils, and its slight fluidity enables it to exert a continuing protective effect upon the surface of dried paint, thereby very greatly increasing the life of paint films.

According to the present invention, this polyester is compounded with natural rubber, and with synthetic rubbers and rubber substitutes and plastics in general. It appears to co-vulcanize with both natural rubber and the various bunas, including simple polybutadiene, the copolymer of butadiene with styrene (known as GR-S) and the copolymer of polybutadiene with acrylonitrile (known as GR-A). In combination with these substances, it shows a very valuable softening action upon the original compound, greatly facilitating the milling and molding of the rubber compound; yet when the compound is cured, the polyester becomes an integral part of the material, thereby avoiding blooming of the softener to the surface and avoiding the addition to the compound of undesirable extractives. With the other rubber substitutes, it is a high grade softener and toughener, especially with such substitutes as the interaction product of ethylene dichloride and sodium polysulfide; with polychloroprene; with factice and the like.

When the material to be plasticized with this polyester is natural rubber, the proportions to be used should be about 1 to 10 parts by weight of polyester to 100 parts by weight of natural rubber. On the other hand, most of the synthetic rubbers require a larger amount of the polyester to obtain best results. Generally, for the highly unsaturated synthetic rubbers, about 10 to 40 parts by weight of the polyester should be used for 100 parts by weight of the synthetic rubber.

Although it is intended to use this polyester with synthetic rubbers of all types, the invention is particularly applicable to synthetic rubbers having a particular range of molecular weight or consistency, as is generally judged by the Mooney test (2-minute test at 212° F.). For instance, in the case of a polybutadiene synthetic rubber, it is best to have a Mooney value of about 45 to 120, preferably about 60 to 100. In the case of butadiene-acrylonitrile synthetic rubber made with about 15 to 45% of acrylonitrile or methacrylonitrile, the Mooney should best be about 50 to 100, preferably about 60 to 90. For a butadiene-styrene synthetic rubber, the so-called GR-S, made with about 15 to 45% styrene, the Mooney range should be about the same as for the butadiene-acrylonitrile synthetic rubber.

These unsaturated synthetic rubbers may be made by any of the various known methods; for instance the commonly used emulsion polymerization technique may be used for polybutadiene or the butadiene-acrylonitrile or the butadiene-styrene synthetic rubbers.

Another type of synthetic rubber which has a relatively low unsaturation, namely having an iodine number of less than 50, and preferably in the range of about 20, is the one which is made by low temperature Friedel-Crafts copolymerization of a major proportion of isobutylene with a relatively minor proportion of a diolefin such as about 5 to 20% of butadiene or about 1 to 5% of isoprene. These materials are copolymerized at exceedingly low temperatures such as $-103°$ C. in the presence of a low boiling material such as liquid ethylene or methylchloride which may serve as diluent and refrigerant, using as catalyst a methylchloride or ethylchloride solution of aluminum chloride which had been made at more elevated temperature and then cooled down to the desired polymerization temperature. This type of synthetic rubber is the one known commercially as GR-I. For such a synthetic rubber it is preferable to use about 5 to 20 parts of polyester for 100 parts of the synthetic rubber. Also the polyesters are processing aids, etc., for rubber like tripolymers formulated from isobutylene, isoprene, divinyl benzene (92%—5%—3%).

The invention may also be applied by using the polyester for plasticizing mixtures of synthetic rubber with other plastics such as polyvinyl chloride. For instance, one such mixture may comprise a butadiene-acrylonitrile synthetic rubber made of about 20 to 45% of acrylonitrile, this synthetic rubber being mixed in the ratio of about 10 to 100 parts by weight of the synthetic rubber to 100 parts by weight of polyvinyl chloride. In such a case, about 20 to 50 parts by weight of the polyester should be used per 100 parts by weight of the polyvinyl chloride.

Any of the above types of compositions which contain substantial amounts of rubber or synthetic rubber can of course be used either without curing or after curing with sulfur and accelerator such as mercaptobenzolthiazole, activators such as zinc stearate, fillers such as carbon black, etc.

The polyester may also be used for plasticizing and otherwise improving some of the harder or relatively brittle types of plastics, especially synthetic materials such as polyvinyl chloride per se or copolymers such as one made by copolymerizing 95% by weight of vinyl chloride and 5% of vinyl acetate. In such compositions, even though the plastic material per se may be relatively saturated and is not normally subject to curing or vulcanizing, the polyester has a particularly desirable compatibility and plasticizing effect with such plastics, and may even in some cases be advantageously cured due to the slight unsaturation of the polyester itself.

If it is desired that the polyester per se be substantially saturated, this may be accomplished either by hydrogenating the polyester itself or hydrogenating the dimerized ester such as the methyldilinoleate prior to cross-esterification with the glycol. Such a polyester made from hydrogenated dilinoleate and esterified with a glycol, was found to be soluble in a highly paraffinic mineral oil having a Saybolt viscosity of 43 seconds at 210° F., and, when dissolved in a concentration of 5% in such oil, raised the V. I. from about 112 up to 124.8. Such a hydrogenated or substantially fully saturated polyester may be used for plasticizing synthetic rubber and other plastics, particularly when it is not desired to have the polyester co-vulcanize with the synthetic rubber, and when it is desired to have a maximum chemical inertness, such as resistance to oxidation or attack by chemical agents.

In compounding the polyester with natural or synthetic rubber or heat-softening plastics, the mixing may suitably be carried out on the conventional rubber mill or in various kneader type or Banbury type mixers. In the case of mixing polyester with a butadiene-acrylonitrile type synthetic rubber a milling temperature of about 200–250° F. is satisfactory, using a milling time of about 10 to 30 minutes. On the other hand, when using the polyester for plasticizing a mixture of butadiene-acrylonitrile synthetic rubber with a polyvinyl chloride, such as described herein above, a higher milling temperature must be used such as 270–330° F., preferably about 280–300° F., with a milling time of about 10 to 30 minutes.

The invention will be better understood from a consideration of the following experimental data.

A portion of soy bean oil consisting of 100 parts by weight was mixed with a liberal excess of methanol and heated to a temperature of 70° C. in the presence of a substantial portion of sodium methylate for a period of several hours. This procedure yielded a mixture of methyl esters of the soy bean oil, and a substantial portion of glycerol; approximately 95 parts by weight of the mixed methyl ester being obtained. The mixed methyl ester of the soy bean oil was then heated to a temperature of 300° C. for a time interval of 16 hours in the presence of an active clay type catalyst, anthraquinone or at a lower temperature for much shorter times with BF₃. This procedure produced a portion of dimerized methyl linoleate plus admixed methyl oleate and admixed methyl stearate. The dimerized linoleate methyl ester appears to have about the following formula:

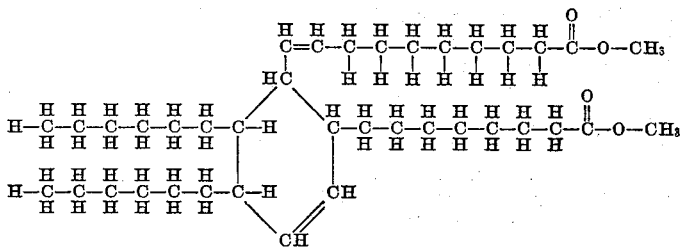

(The physical properties of dilinoleic acid are:

Unsaturation—two double bonds
Molecular weight—560
Neutral equivalent—280
Conjugation—negligible
Melting point—non-crystalline at −60° C.)

The resulting mixture was distilled at a temperature of 250° C. and a pressure of 760 mms. of Hg to separate the dimerized methyl linoleate from the other substances. In this separation, methyl oleate and stearate are distilled out and removed, leaving behind the dimerized methyl linoleate. Approximately 40 parts by weight of purified dimerized methyl linoleate were obtained from 100 parts by weight of the raw soy bean oil. The purified dimerized methyl linoleate in the proportion of 40 parts by weight was then mixed with 4.5 parts of ethylene glycol and heated for 194 hours at 225° C. in the presence of about 0.05 part of p-toluene-sulfonic acid. The p-toluene-sulfonic acid is the catalyst for the glycolysis reaction. In order to assure rapid removal of by-products from the reaction, the melt was blown with pure nitrogen. This procedure resulted in the following reaction:

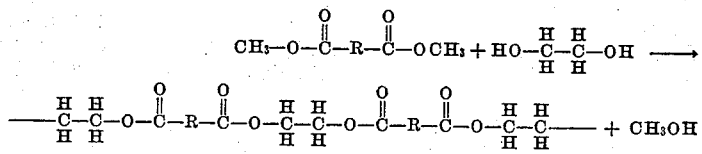

The resulting methanol was removed from the material by heating and distillation to yield the desired condensation product of dimerized methyl linoleate and ethylene glycol.

The condensation product had a molecular weight (as determined by the Paul J. Flory method (Journal of the American Chemical Society, volume 62, 1057 (1940)) of approximately 10,000 and an iodine number of 98. The material had a light yellow color closely corresponding to that of a good grade of Mid-Continent phenol-extracted lubricating oil. The condensation product was free from odor and taste and by itself had a viscosity of approximately 26+ at 100° C. (Gardner-Holdt). The super-polyesters were also very soluble in chloroform and were non-crystalline plastic solids which exhibited elastic properties.

Some of this polyester was treated with a sulfurized alkylated phenol containing barium incorporated thereinto by a treatment with barium hydroxide. The material which is an excellent anti-oxidant has the following structural formula:

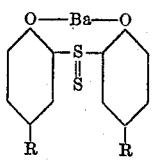

(in which R may be any convenient or desired aliphatic or aromatic substituent). In this case R was an iso-octyl group. This material was found to be compatible with the polyester over a wide range of temperatures. This characteristic of ready solubility and compatibility between the polyester and the barium iso-octyl phenol sulfide is of importance in that the resulting mixture can be compounded directly into synthetic rubbers and plastics of various types.

An ethylene glycol-methyldilinoleate polyester made as described above, and having a molecular weight of about 10,000 by the Staudinger method, which had the consistency of a very thick viscous liquid, was used in several proportions for plasticizing a butadiene-acrylonitrile synthetic rubber which was made with 26% of acrylonitrile and had a two-minute Mooney of 90 at 212° F., and then compounded according to the formula indicated herebelow and cured.

| Ingredient | Parts by weight |
|---|---|
| Synthetic rubber | 15 |
| Zinc oxide | 0.75 |
| Stearic acid | 0.15 |
| Mercaptobenzothiazole | 0.15 |
| Sulfur | 0.225 |
| Carbon black | 7.5 |
| Polyester | 0, 3.0, and 6.0 in the three mixes |

The resulting three mixed batches were then cured for 60 minutes at 287° F., and the vulcanized products were subjected to mechanical tests with the following results:

| Tests | Parts by Weight of Polyester | | |
|---|---|---|---|
| | 0 | 3.0 | 6.0 |
| Modulus (at 300% elongation) | 1,074 | 800 | 139 |
| Tensile strength (#/sq. in.) | 4,808 | 3,000 | 530 |
| Elongation (percent) | 690 | 700 | 676 |
| Tack on raw stock | very slight | fair | fair |

The above data show that the 3 parts by weight of the polyester per 15 parts by weight of the butadiene-acrylonitrile synthetic rubber gave considerable improvement in the raw stock tack without excessive loss in tensile strength and modulus. The 6 parts by weight of polyester were apparently more than necessary and desirable in view of the relatively low sulfur cure; this however, would be satisfactory if the amount of sulfur were doubled in order to obtain higher tensile strength and modulus.

It should also be mentioned that the polyester improves the sunlight aging of butadiene-acrylonitrile synthetic rubber.

The multi ester, as above disclosed, has a substantial amount of unsaturation and a comparatively high iodine number. If desired, the iodine number can be reduced by a hydrogenation treatment of the di-linoleic acid, prior to the glycolysis reaction. This procedure results in a multi ester having a relatively very low iodine number and a higher stability and resistance to oxidation.

Alternatively, the unsaturated multi ester, may be treated with chlorine or other halogen, with sulfur chloride, with oxygen, and the like to modify the multi ester, reduce its unsaturation and incorporate into the lubricant, inorganic elements which markedly improve the extreme pressure characteristics. This is especially valuable with the greases and heavy oils suitable for lubricants in which a substantial percentage of chlorine, sulfur, oxygen or phosphorus can be incorporated for the benefit to be obtained by the presence of such substances.

The dibasic acid may be esterified with aliphatic glycols, as above pointed out, or with aromatic diols having a wide range of organic and inorganic substituents at other points in the benzene ring, as shown in columns 9 and 10 of the parent application, Ser. No. 504,754, now Patent 2,424,588.

It is not necessary that either component be a strictly linear chain compound but either component, either the di-basic acid or di-acid base, may have aromatic substituents in the linear chain between the terminal groups, or in side chains on the chain between the terminal groups; and side chains of substantially any size, number and disposition are useful and effective and yield many varied improvements in the characteristics of the resulting polyester.

While there are above disclosed but a limited number of embodiments of the composition of the present invention, it is possible to produce still other embodiments without departing from the inventive concept herein disclosed and it is therefore desired that only such limitations be imposed on the appended claims as are stated therein or required by the prior art.

We claim:

1. A product comprising a major proportion of a mixture of the butadiene acrylonitrile synthetic rubber made with about 15 to 45% by weight of acrylonitrile, and polyvinyl chloride, having also homogeneously admixed therewith a high molecular weight linear polyester condensation product of a dimerized linoleic acid and ethylene glycol, said polyester having an average molecular weight of at least 2,000, the proportions of said ingredients being about 10 to 100 parts by weight of the synthetic rubber and about 20 to 50 parts by weight of the polyester, per 100 parts by weight of the polyvinyl chloride.

2. The vulcanized product of claim 1.

3. A method of preparing improved compositions containing vulcanized butadiene-acrylonitrile synthetic rubber, which comprises admixing with a vulcanizable butadiene-acrylonitrile synthetic rubber, and mixtures thereof with high molecular weight vinyl chloride polymer, a linear polyester condensation product of a dimerized unsaturated vegetable oil fatty acid with a glycol having the formula HO-R-OH in which R is a saturated aliphatic hydrocarbon group, said polyester having an average molecular weight of at least 2,000, said polyester being present in the proportions of about 1 to 40 parts by weight per 100 parts by weight of vulcanizable rubber constituent, also mixing said polyester and vulcanizable rubber material with vulcanizing materials including sulfur and accelerator, shaping the mixture to the desired finished form, and curing the mixture under vulcanization conditions of temperature and time, whereby said polyester is co-vulcanized with said vulcanizable rubber constituent.

4. A product comprising a major proportion of a mixture of a butadiene-arcylonitrile synthetic rubber made with about 15 to 45% by weight of acrylonitrile, and polyvinylchloride, having also homogeneously admixed therewith a high molecular weight linear polyester condensation product of a dimerized unsaturated vegetable oil fatty acid with a glycol having the formula HO-R-OH in which R is a saturated aliphatic hydrocarbon group, said polyester having an average molecular weight of at least 2,000, the proportions of said ingredients being about 10 to 100 parts by weight of the synthetic rubber and about 20 to 50 parts by weight of the polyester, per 100 parts by weight of the polyvinylchloride.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,310,449 | Lightbown et al. | Feb. 9, 1943 |
| 2,339,387 | Endres | Jan. 18, 1944 |
| 2,373,015 | Cowan et al. | Apr. 3, 1945 |
| 2,386,405 | Meincke | Oct. 9, 1945 |
| 2,429,219 | Cowan et al. | Oct. 21, 1947 |
| 2,435,853 | Sutherland | Feb. 10, 1948 |

FOREIGN PATENTS

| Number | Country | Date |
|---|---|---|
| 883,625 | France | July 9, 1943 |

OTHER REFERENCES

Resinous Reporter, vol. V, No. 1, February 1944, Resinous Prod. and Chem. Co., page 8.

Resinous Reporter, vol. V, No. 3, July 1944, Resinous Prod. and Chem. Co., pages 6–8.

Emmet, Ind. and Eng. Chemistry, vol. 36, #8, August 1944, pp. 729–734.

India Rubber World, vol. III, October 1944, page 77 (3 col.).

Chem. & Eng. News, December 10, 1944, page 2115.